United States Patent [19]
Iwata et al.

[11] Patent Number: 5,962,783
[45] Date of Patent: Oct. 5, 1999

[54] APPARATUS FOR DETECTING ROTATIONAL SPEED

[75] Inventors: Nobuo Iwata, Sagamihara; Mitsugu Sugiyama; Toshiya Sato, both of Yokohama; Tadashi Shinohara, Tokyo; Yutaka Shio; Tomonori Yabuta, both of Yokohama, all of Japan

[73] Assignee: Ricoh Company, Ltd., Tokyo, Japan

[21] Appl. No.: 08/892,655

[22] Filed: Jul. 15, 1997

[30] Foreign Application Priority Data

Jul. 15, 1996 [JP] Japan ................................. 8-184424

[51] Int. Cl.⁶ ........................................................ G01P 15/00
[52] U.S. Cl. ................................................ 73/488; 356/25
[58] Field of Search ................ 73/488, 489; 250/231.13, 250/231.14, 231.15, 231.16, 231.17, 231.18, 231.1, 232, 233; 356/23, 24, 25; 340/670; 364/565

[56] References Cited

U.S. PATENT DOCUMENTS

| | | | |
|---|---|---|---|
| 3,136,117 | 6/1964 | Speiser | 73/488 |
| 4,417,141 | 11/1983 | Phillips | 250/231.13 |
| 4,786,891 | 11/1988 | Ueda et al. | 341/13 |
| 4,908,510 | 3/1990 | Huggins et al. | 250/231.13 |
| 5,051,579 | 9/1991 | Tsukiji et al. | 250/231.16 |
| 5,065,324 | 11/1991 | Oshita et al. | 364/424.05 |
| 5,073,710 | 12/1991 | Takagi et al. | 250/231.14 |
| 5,412,302 | 5/1995 | Kido et al. | 318/685 |

FOREIGN PATENT DOCUMENTS

7-225544  8/1995  Japan .
7-306612  11/1995  Japan .

*Primary Examiner*—Hezron Williams
*Assistant Examiner*—Richard A. Moller
*Attorney, Agent, or Firm*—Oblon, Spivak, McClelland, Maier & Neustadt, P.C.

[57] ABSTRACT

An apparatus for a rotational speed detecting includes a rotating disc having plural slits in a circumferential direction. A radiant element radiates light rays through the slits. A photodetector receives the rays radiated by the radiant element. Peak detectors detects peak points of the detected signal and a calculator calculates a rotational speed. The photodetector include two photodetectors separated by a distance $\Delta L$.

16 Claims, 9 Drawing Sheets

APPARATUS FOR DETECTING ROTATIONAL SPEED

BACKGROUND OF THE INVENTION

1. Field of the Invention

The present invention relates to an apparatus for detecting a rotational speed of an element such as a photosensitive drum, a carrying roller, etc. which may be included in devices such as a copier, a printer, etc.

2. Discussion of the Background

Figure 8:
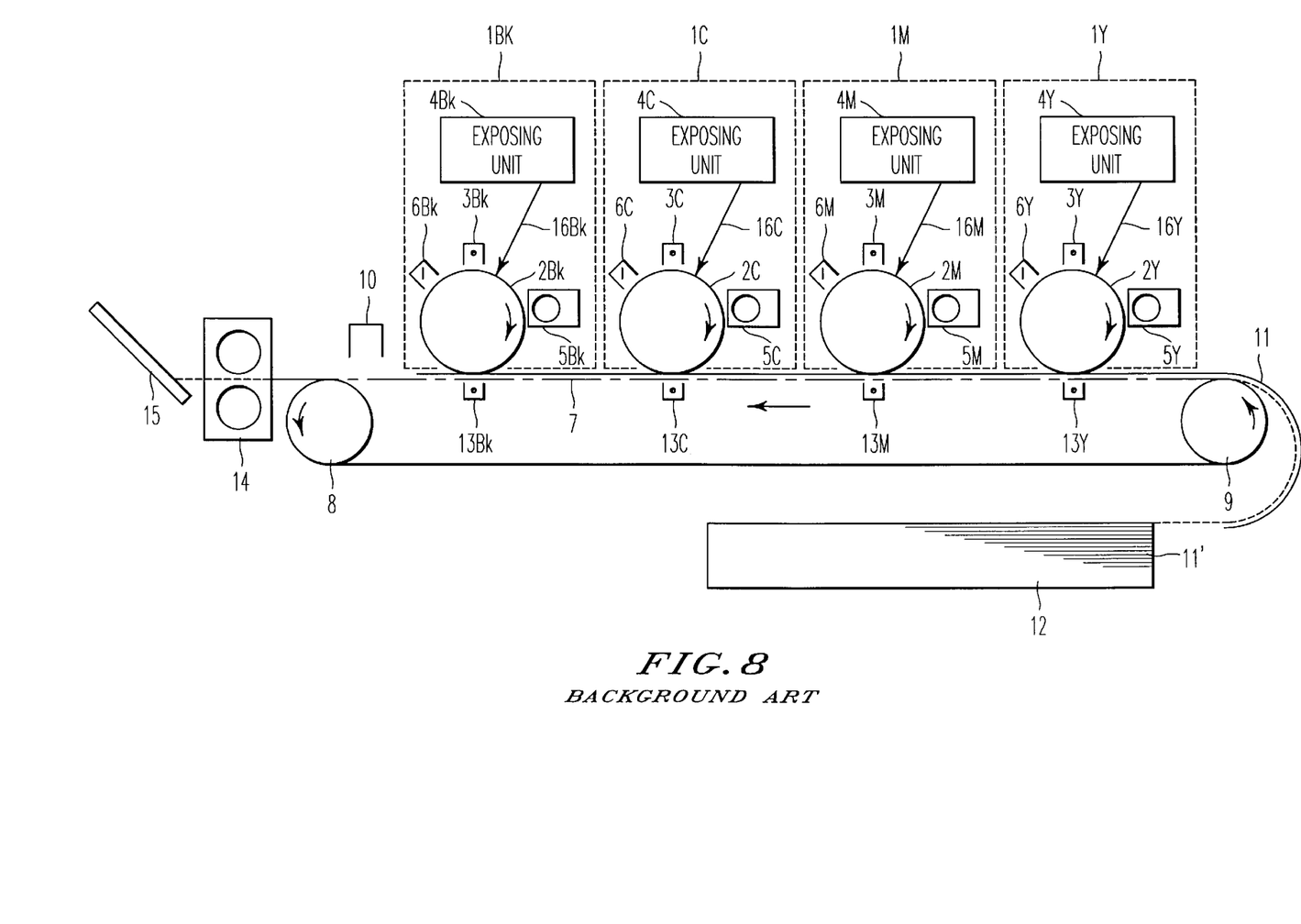
FIG. 8 is an outline view showing a structure of a background color image forming apparatus.

FIG. 8 is a view showing an outline structure of a background color image forming apparatus. In this apparatus image forming portions 1Y, 1M, 1C, 1Bk which form different color images (e.g., respectively of yellow, magenta, cyan, black) are placed in a row along a carrying belt 7 for carrying recording paper sheets. The carrying belt 7 is spanned between carrying rollers 8 and 9, each carrying roller 8, 9 having a driving roller at one side and a free roller at another side. Accordingly, the carrying belt 7 is rotated in the direction indicated by the arrow direction by the carrying rollers 8, 9. A paper tray 12 for storing stored recording paper sheets 11' is placed under the carrying belt 7.

An upper recording paper sheet 11 stored in the paper tray 12 is drawn to the carrying belt 7 by a carrying mechanism (not shown), and is absorbed to the carrying belt 7 by an electrostatic force, and is drawn when an image forming operation is to be executed. The drawn recording paper sheet 11 is carried to first image forming portion 1Y (e.g., yellow) and a yellow image is formed on the drawn recording sheet at this position. The first image forming portion 1Y includes a photosensitive drum 2Y, a charger 3Y placed around the photosensitive drum 2Y, an exposing unit 4Y, a developing unit 5Y, and a cleaning unit 6Y. After the photosensitive drum 2Y is uniformly charged by the charger 3Y, a surface of the photosensitive drum 2Y is exposed to a laser beam in response to a color image by the exposing unit 4Y, the developing unit 5Y, and the cleaning unit 6Y. That is, after the photosensitive drum 2Y is uniformly charged by the charger 3Y, a surface of the photosensitive drum 2Y is exposed to a laser beam in response to a color image by the exposing unit 4Y, and thereby an electrostatic image is formed on the photosensitive drum 2Y. The formed electrostatic image is then developed by the developing unit 5Y, and a toner image is thus visualized on the photosensitive drum 2Y. The toner image is then transferred to the recording paper sheet 11 at a contacting position of the photosensitive drum 2Y and the recording paper sheet 11 on the carrying belt 7 (transferring position) by a transferring unit 13Y, and thereby a single color image (e.g., yellow image) is formed on the recording paper 11.

Residual toner remaining on the surface of the photosensitive drum 2Y is cleaned by the cleaning unit 6Y, and the photosensitive drum 2Y is thus prepared for a next image forming operation. In this situation, the recording paper sheet 11 having the transferred single color image (e.g., yellow) from the first image forming portion 1Y is carried to a second image forming portion 1M (e.g., magenta). In this situation, a next toner image (e.g., magenta) formed on the photosensitive drum 2M is transferred to the recording paper 11 sheet to be superposed on the first (e.g., yellow) toner image by the same operations as discussed above. Furthermore, the recording paper sheet 11 is then carried to the third image forming portion 1C (e.g., cyan), and then the fourth image forming portion 1B (e.g., black), and the same operations are then repeated. With these operations, four toner images (e.g., yellow, magenta, cyan, black) are transferred to the paper sheet 11 and thus a full color image is formed on the paper sheet 11. The paper sheet 11 after passing by the fourth image forming portion 1Bk is then removed from the carrying belt 7 and the image thereon is fixed by a fixing unit 14, and the paper sheet 11 is then discharged to a discharging tray 15.

Figure 9:
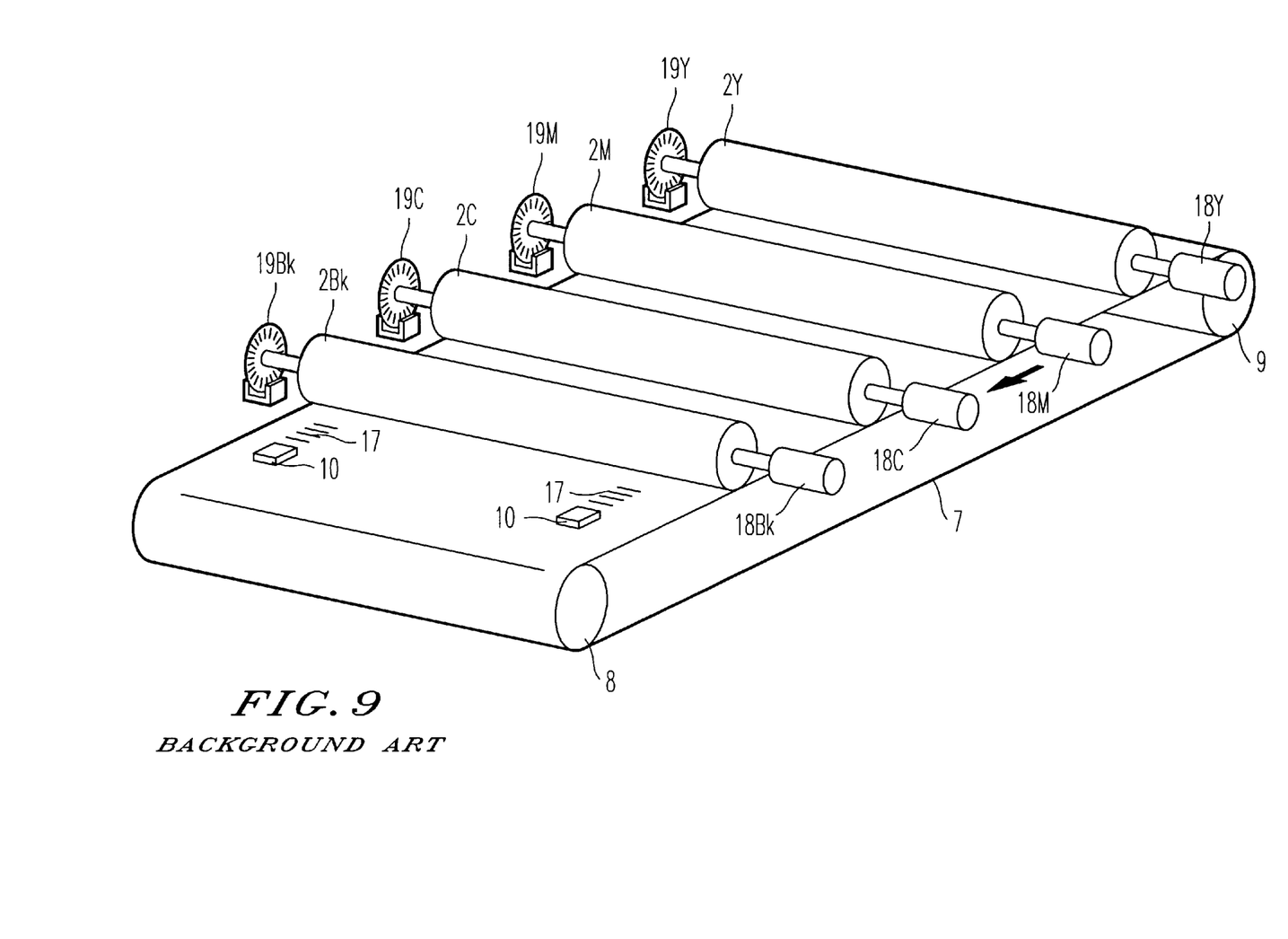
FIG. 9 is a perspective view showing a detecting structure of a photosensitive drum by a background rotary encoder.

The above image forming apparatus which places four image forming portions 1Y, 1M, 1C, 1Bk in one row has advantages that a printing speed is faster than other types of apparatus. However, this type of image forming apparatus has a defect in that slipping among the four color images easily results after forming the four color images on recording paper sheets over and over again, and thereby an image quality deteriorates. To solve this problem, a resist forming correction can be carried out for avoiding mispositioning of images by forming a resist mark 17 on the carrying belt 7, as shown in FIG. 9. A positioning of the resist mark 17 for each image formed is detected by a resist mark sensor 10, and positioning is carried out by adjusting a timing of the laser beam output from each of the exposing units 4 based on the detections of the resist marks 17.

However, the background resist positioning correction is limited to positional correction for static resist mispositioning as a variation of attaching positional accuracy in each unit. In reality, however, mispositioning appearing on the output color image is not limited to the above static resist mispositioning. For example, if there are variations in rotating speeds in each photosensitive drum 2, or variations in carrying speeds of the carrying belt 7, or variations in a driving gear pitch, etc., an irregular pitch of scanning lines in a scanning direction with a special frequency may be produced. This irregular pitch can appear on the output image as an irregular density called "BANDING". Namely, a dynamic mispositioning can appear on an output image.

As a correcting method for this mispositioning with a special frequency, as shown in Japanese unexamined patent (KOKAI) No. 7-225544, a method which detects a speed variation of a photosensitive drum and which controls a record timing in response to the detected speed can be implemented. Further, as another method, a method of correcting a rotational driving of a photosensitive drum in response to a detected speed variation of the photosensitive drum can be implemented. The above methods will now be explained with reference to FIG. 9 which shows a partial structure of a background image forming apparatus. Rotary encoders 19Y, 19M, 19C, 19BK for detecting a rotating speed of the photosensitive drums 2Y, 2M, 2C, 2BK are attached to a rotating shaft of each respective photosensitive drum 2Y-2BK. A detected speed variation by each rotary encoder 19 is fed back to a rotating control circuit of a respective photosensitive drum driving motor 18Y, 18M, 18C, 18BK which is attached to a rotating shaft of each respective photosensitive drum 2 at an opposite side to the respective rotary encoder 19.

As mentioned above, when detecting a rotational speed of the photosensitive drums 2, rotary encoders 19 are usually utilized, which rotary encoders 19 are expensive elements. If a heightened accuracy of detecting the rotational speed of each photosensitive drum 2 is required, a number of slits in a disc of each rotary encoder 19 can be increased, but however this results in a cost of the rotary encoders 19 increasing. In the image forming operations of the toner type image forming apparatus as shown in FIG. 8 and FIG. 9, because of having to attach a rotary encoder 19 to each of the four photosensitive drums 2, a cost of the rotary encoders 19 can not be ignored.

Furthermore, even if using an accurate rotary encoder 19, the attaching accuracy of the rotary encoder 19 can be very important. Namely, when a rotating axis of the photosensitive drums 2 and a rotating axis of the respective rotary encoders 19 do not correspond accurately, it is impossible to detect a rotational speed accurately. For example, Japanese unexamined patent publication (KOKAI) No. 7-306612 notes that if an axis of the rotary encoder 19 does not properly correspond to an axis of the photosensitive drum 2 perfectly, it is impossible to detect a rotational speed of the photosensitive drum 2 accurately. When there is a difference in a position between a rotating axis of the rotating encoder 19 and an axis of a rotating body as a detecting object, an accuracy of a detecting speed can worsen.

Figure 10:
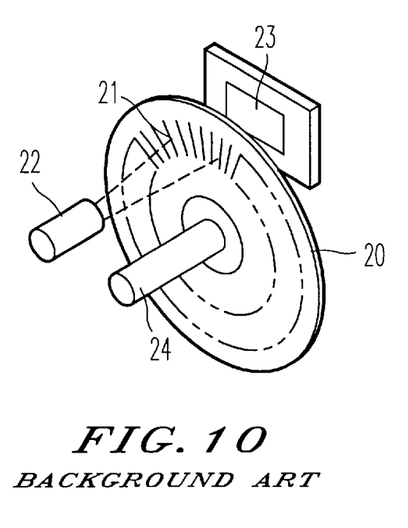
FIG. 10 is a perspective view showing a structure of a background rotary encoder.

Now, a case of a difference in a position between a rotating axis of a rotating body, such as a photosensitive drum, and a rotating axis of a rotary encoder for detecting speed will be considered. FIG. 10 is a view showing a general rotary encoder which includes slits 21 with a narrow pitch formed on a rotating disc 20. The rotating disc 20 rotates around a rotating axis 24. A radiant element 22 radiates rays to pass through the slit 21 of the rotating disc 20, which rays are detected by a photodetector 23. There are many encoders which have a structure of placing fixed slits 21 between a rotating disc 20 and a photodetector 23. In this type of encoder, the radiant element 22 and the photodetector 23 detect variations in speed by detecting the passing of the slits 21 in a placed position.

Figure 11:
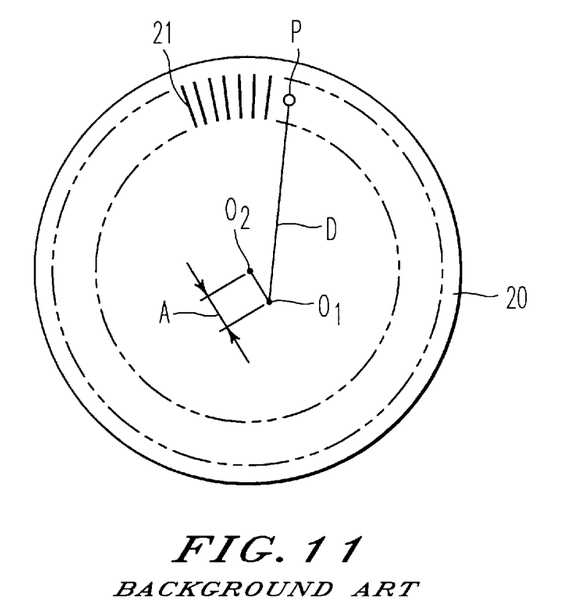
FIG. 11 is a view showing a relation of a positional difference of a disc axis in the background rotary encoder.
Figure 12A:
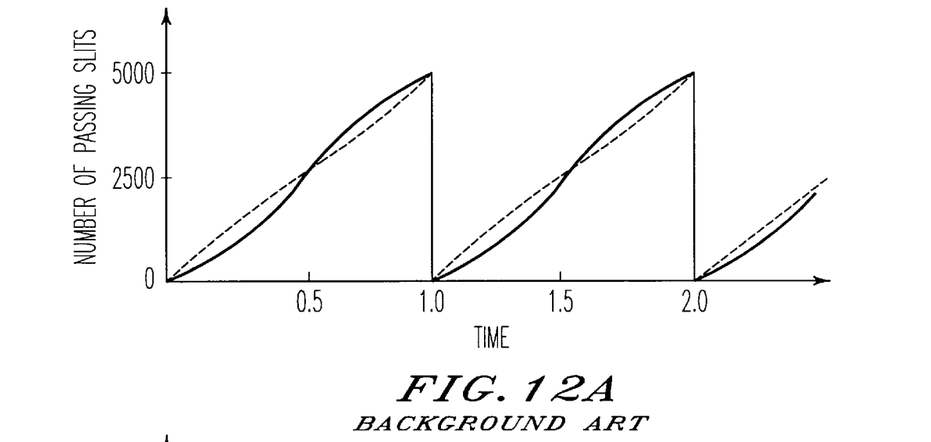
FIG. 12(a) is a graph showing a number of passing slits as a detecting condition in the background rotary encoder.
Figure 12B:
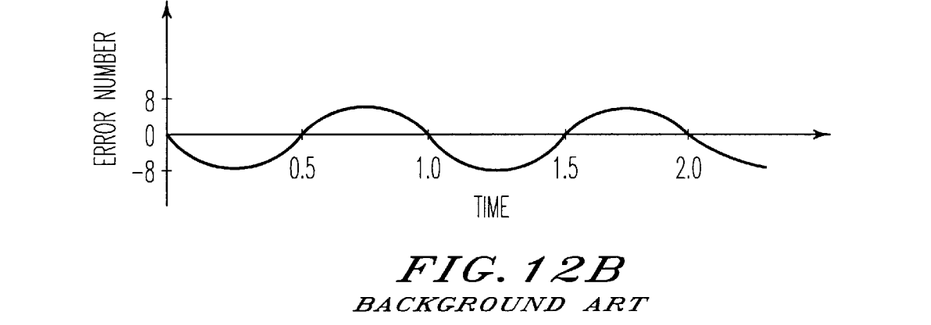
FIG. 12(b) is a graph showing an error number of slits in a background rotary encoder.
Figure 12C:
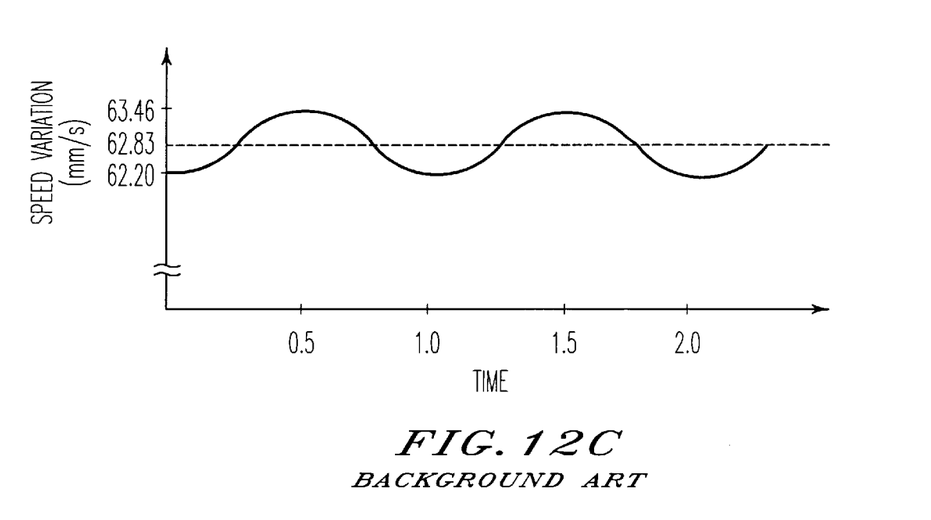
FIG. 12(c) is a graph showing speed variation in a background rotary encoder.

FIG. 11 is a view showing a situation of how an error arises between a rotating axis O1 (rotating center) of a rotating body and a rotating body and a rotating axis O2 (circle center) of a rotating disc 20 of the encoder. If a mispositioning occurs between the rotating axis 24 of the rotating disc 20 and a rotating axis of a rotating body, the rotating disc 20 does not accurately rotate around the rotating axis O1 of the rotating body, namely it rotates eccentrically. A distance from the rotating axis O1 of the rotating body to the detecting position P is D, a difference in position between the rotating axis O1 and the axis O2 of the rotating disc 20 is A, and the rotating body rotates with a constant angular velocity W0. In this situation, if D=10 (mm), A=0.1 (mm). W0=2π(rad/sec), a number of slits 21 passing the detecting position P is as shown in FIG. 12(a). In this situation, as the rotating disc 20, a rotary encoder which has 5000 slits per one round with equal pitch may be used. In FIG. 12(a), the dashed line shows a number of slits 21 passing the detecting position P when there is no mispositioning of the axes, and the solid line shows a number of slits passing the detecting position P when there is a difference in the axes positioning as shown in FIG. 11. FIG. 12(b) shows a difference (error number) between a passing slit number when there is a difference in the axes position and a passing slit number when there is no difference in the axes position. In this situation, about an eight slit difference (error number) is shown. When detecting a rotational speed of a rotating body of a detecting object, an error of passing slits at the detecting position appears as a detected speed error. FIG. 12(c) shows this resulting detected speed error in the slits 21 passing at the detecting position P (a speed error of ±1% is produced for an ideal speed (the dashed line)).

In the above-mentioned operation, an error of a detected speed by a positional difference between an axis of a rotating body and an axis of an encoder is explained. When detecting a rotational speed of a rotating object, such as a photosensitive drum, by an encoder, a true speed variation of the rotating body to be detected should be within 1%. As noted above, the mispositioning as shown in FIG. 11 results in a greater error. Therefore, a detected speed variation resulting from a positional difference (mispositioning) of the axes can not be ignored. Accordingly, for avoiding such a detecting error, high mechanical accuracy between a rotating axis of a photosensitive drum and an axis of an encoder is necessary. FIG. 12 shows a case in which a pitch of slits 21 is at an ideal equal interval. In the background art, a number of the slits 21 is a factor for calculating an angular velocity of the rotating body. Therefore, if there is a variation of the slit pitch, this may also result in an error in the detected speed.

SUMMARY OF THE INVENTION

It is therefore an object of the present invention to provide a novel apparatus for detecting a rotational speed of a rotating object with a high accuracy, without adverse influence by a positional difference between an axis of a rotary body and an axis of a speed sensor, or by a variation in a pitch of slits in the speed sensor.

In accordance with a first structure of the present invention, the above object can be achieved by an apparatus for detecting a rotational speed including a rotating disc having plural slits in a circumference direction, the slits extending in a radial direction for a rotating axis attached so as to rotate in synchronization with a rotary body of a detecting object. Plural sensors detect a passing time of each slit formed on an outside circumference of the rotating disc with an interval in a circumference direction. A rotational speed of the rotating body is then calculated based on a difference between detected times by each sensor.

In accordance with a further feature of the present invention, the sensor detects the passing time of slits by detecting a variable signal of a detected intensity when the slits pass the detecting position, and thereby detect a time of a peak position of the detected.

In accordance with a further feature of the present invention, the detected rotational speed data is smoothed in response to a component of a speed variation in the rotational speed of the rotating body.

One feature of the present invention is that if a base of calculating a rotational speed is time required when one slit passes between the sensors, by not dividing a rotating speed into a number of slits passing the sensors, a positional difference of an axis and a variation of a slit pitch can not become factor in detecting an error.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
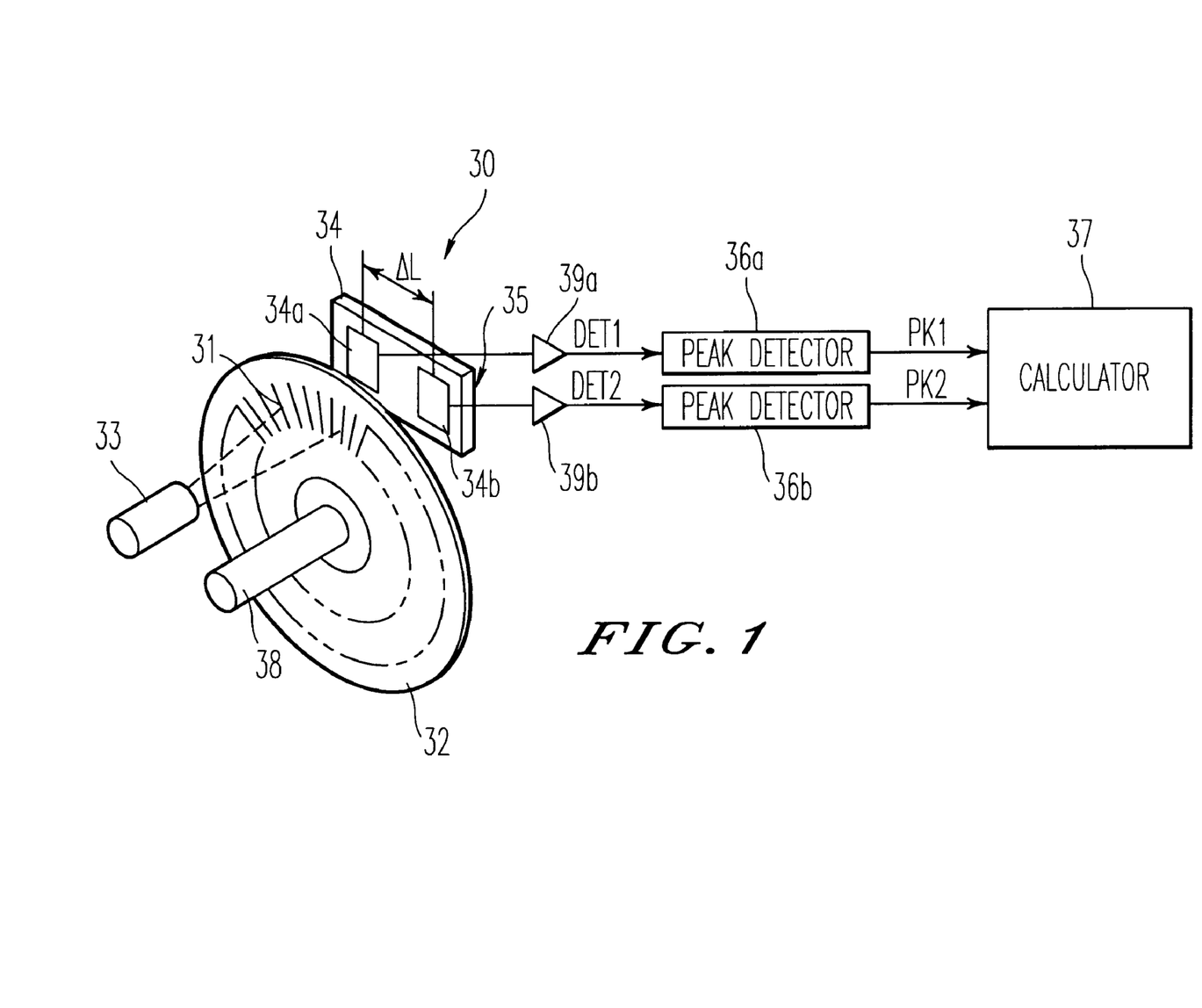
FIG. 1 is an outline view showing an apparatus for detecting a rotational speed in accordance with an embodiment of the present invention.

Referring now to the drawings, wherein like reference numerals designate identical or corresponding parts throughout the several views, and more particularly to FIG. 1 thereof, a preferred embodiment of an apparatus for detecting a rotational speed in the present invention will be described.

An embodiment of the present invention will now be explained with reference to FIGS. 1–7. As shown in FIG. 1, an apparatus according to the present invention for detecting a rotational speed of an object includes a rotating disc 32 including slits 31 in a circumference direction, a radiant element 33, such as an LED which radiates light rays to the slits 31, a photodetector 34, such as a photodiode receiving radiant rays from the radiant element 33, peak detectors 36a, 36b detecting peak positions of detected signals from the photodetector 34, and a calculator 37 for calculating a rotational speed. The above radiant element 33 and photosensor element 34a form one detecting unit, and the radiant element 33 and photosensor element 34b form another detecting unit.

The rotating disc 32 has a rotating shaft 38 attached to a rotating body of an object for which rotation is to be detected. The slits 31 of the rotating disc 32 are formed radiating out from the rotating shaft 38. The photodetector 34 includes two photodetecting elements 34a, 34b separated by an interval ΔL in a rotational direction of the rotating disc 32, each photodetecting element 34a, 34b detecting a passage of slits 31 independently. Signals detected by the two photodetectors 34a, 34b are amplified in respective detecting amplifiers 39a, 39b, and detected signals DET1, DET2 output of amplifiers 39a, 39b are supplied to respective peak detectors 36a, 36b. The peak detectors 36a, 36b detect peak points of each respective detecting signal DET1 DET2 and output respective peak detecting signals PK1, PK2. Furthermore, the peak detecting signals PK1, PK2 are input to the calculator 37, and a rotational speed of the rotating shaft 38 is calculated based on the peak signals PK1, PK2.

Figure 2A:
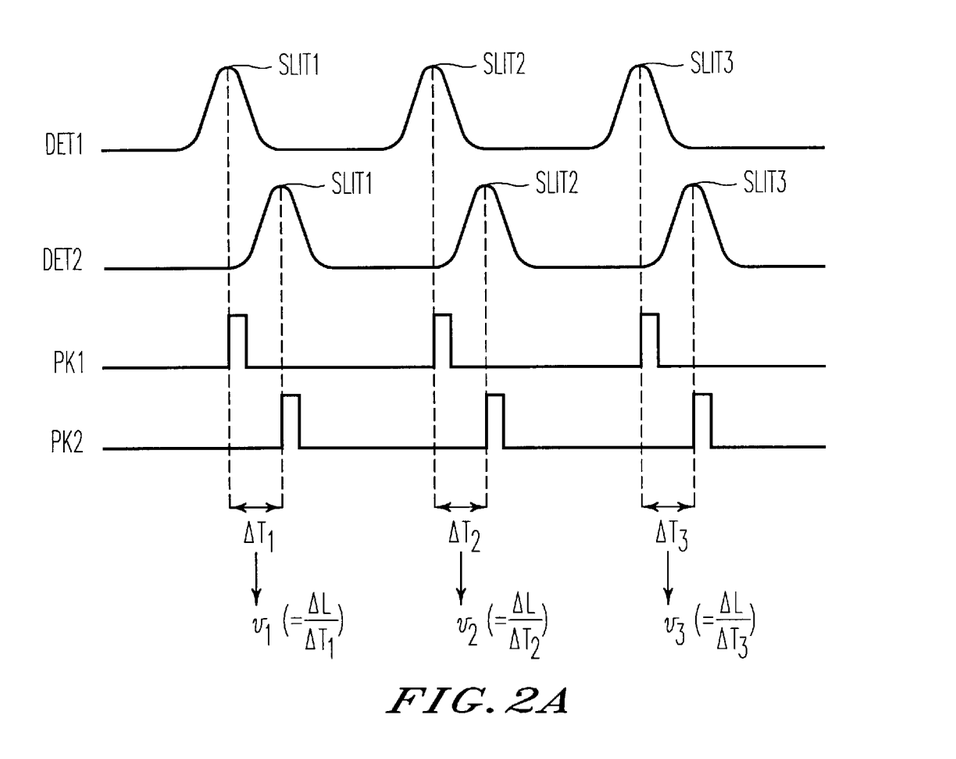
FIG. 2(a) is a view showing a detecting signal and a peak detecting signal in response to the detecting signal.
Figure 2B:
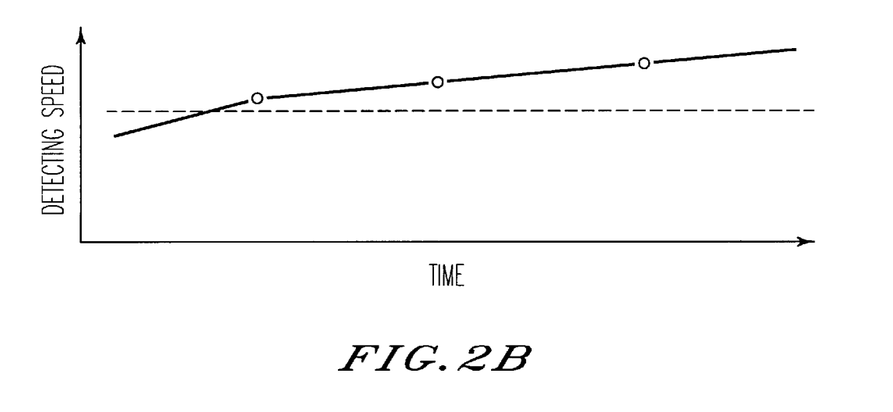
FIG. 2(b) is a view plotting calculated velocity based on a peak detecting signal.

FIG. 2 shows states of each signal in the apparatus 30 for detecting a rotational speed of an object. As shown in FIG. 2(a), noted slits 1–3 are three consecutive slits of the rotating disc 32, and FIG. 2(a) shows the detecting signal of these slits 1–3. As the two photodetecting elements 34a, 34b are separated from each other by the distance ΔL, the detecting signals DET1, DET2 have a time difference ΔT. The peak detecting devices 36a, 36b detect peak points of the detecting signals DET1, DE2, and output peak detecting signals PK1, PK2 rising at the peak points. FIG. 2 also shows an operation of the calculator 37. First, the calculator 37 measures a time difference ΔT between the peak detecting signals PK1, PK2. In this situation, time difference signals ΔT1, ΔT2, ΔT3 are shown indicating a time difference in response to the detection of each of slit 1, slit 2, slit 3. Furthermore, the calculator 37 calculates velocities V1, V2, V3 for each of slit 1, slit 2, slit 3. Each velocity V is calculated by V=ΔL/ΔT. FIG. 2(b) shows a plot of the calculated velocities, the dashed line therein showing an ideal velocity. In this way, the velocity V is calculated by the detected time difference ΔT when each of slit 1, slit 2, slit 3 passes the two photodetecting elements 34a, 34b. The operations of the calculator 37 can be carried out by elements such as a CPU with a calculating function.

Figure 3:
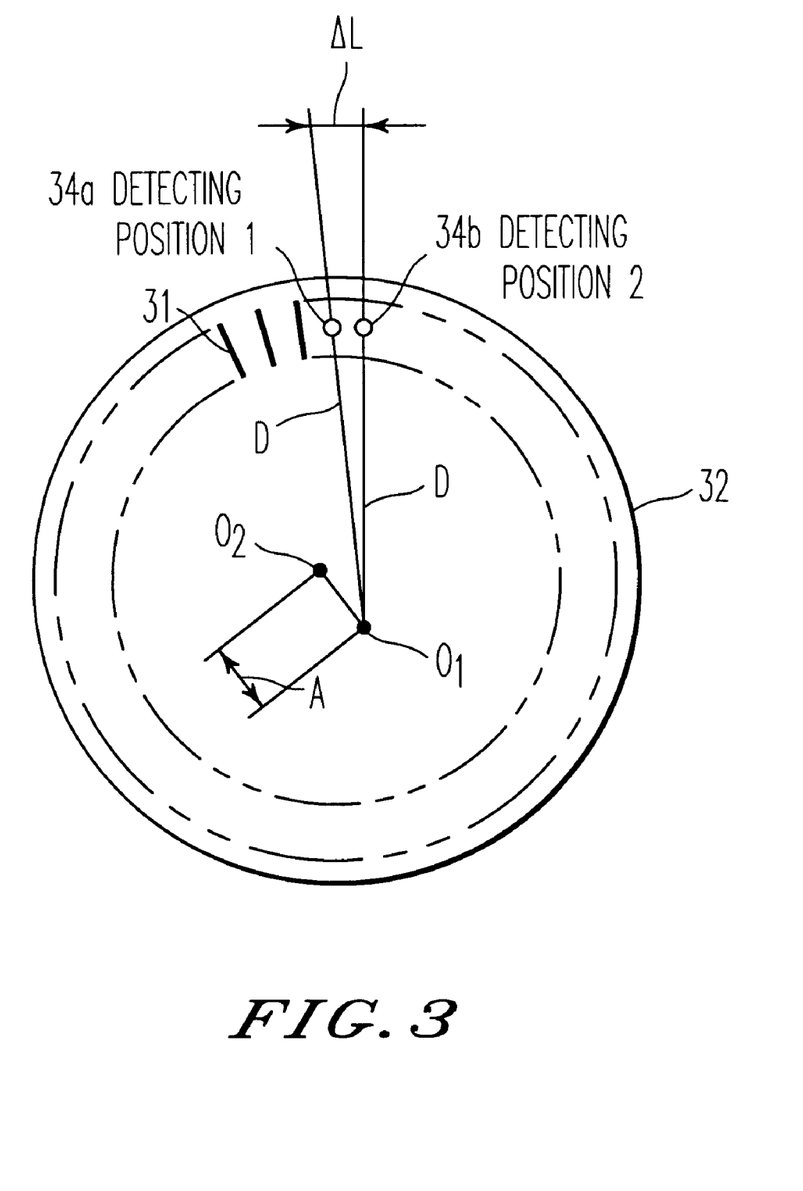
FIG. 3 is a view showing a relation between a positional difference of an axis of a rotating disc and a detecting position.

It will now be explained that a speed detecting operation by the apparatus 30 for detecting speed in the present invention is not influenced by a positional difference between an axis of a rotating body and the axis 38. FIG. 3 is a view of certain elements of the apparatus 30 for detecting rotating speed in accordance with the present invention. The photodetecting elements 34a, 34b are positioned to have a distance D from the rotating axis O1 of the rotating object respectively. FIG. 3 shows a situation of a mispositioning by the axis O2 of the rotating disc 32 being located away from a rotating axis O1 of a rotating body by a distance A. In this structure, when one slit 31 passes the detection position 1 of photodetecting element 34a, the slit 31 having passed the detecting position 1 then passes the detecting position 2 of photodetecting element 34b after time ΔT. Accordingly, the velocity V is calculated by dividing the distance ΔL by the time difference ΔT. This method of calculating the velocity V by utilizing the time difference ΔT at the detecting positions of photodetecting elements 34a, 34b detects speed without a relation to a number of slits 31 passing the detecting positions of photodetecting elements 34a, 34b. That is, a distance between the rotating axis O1 and each of the detecting positions of the respective photodetecting elements 34a, 34b is kept constant, and thereby a detecting speed is not related to a positional difference of axes. Accordingly, an error in a detecting speed resulting from positional differences of axes as in the background art does not result, and thus a rotating speed of a rotating body can be accurately detected.

As the operation in the present invention detects a time difference ΔT for detecting each slit 31, the detected speed is also not dependent on variations of a pitch of the slits 31. Accordingly, even if there is a variation in a pitch of the slits 31, a speed error based on such a variation does not result.

Accordingly, with the present invention a highly accurate structure and assembling technique are not necessary, and it does not become necessary to heighten a pitch accuracy of the slits 31 of the rotating disc 32. Therefore, manufacturing costs can be reduced.

Figure 4A:
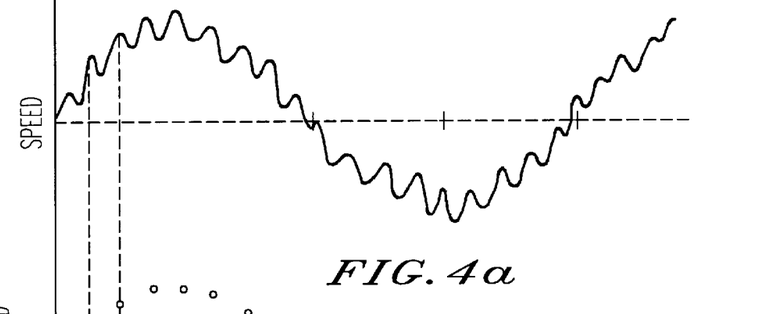
FIGS. 4(a)–4(c) are graphs showing a relation among a variation of a rotational speed of a photosensitive drum, a detected speed, and a smoothed detecting speed.

The use of the present invention for detecting a rotational speed of a photosensitive drum in an image forming apparatus will now be more specifically considered. FIG. 4(a) shows actual speed variations of a photosensitive drum. With regard to speed, a DC component (dashed line) of speed shows an average rotational speed of a photosensitive drum. An AC component (variation component) of speed shows a speed variation of the rotational speed. The AC component of the speed indicates a speed variation of a low frequency (less than several Hz) and a speed variation of a high frequency (about several scores Hz). In this situation, the speed variation of the low frequency appears in about one rotation of the photosensitive drum and is produced by things like eccentricity of a rotational drive mechanism of the photosensitive drum. The speed variation of the high frequency is produced by things like a pitch variation or a vibration of a rotational driving gear.

When calculating a speed of the photosensitive drum with a speed variation, the DC component of speed can be easily calculated by one rotation time of the photosensitive drum. Namely, only one rotation time has to be calculated of the apparatus 30 for detecting a rotating speed when attached to a rotating shaft of a photosensitive drum. Still it is possible to obtain the speed by calculating an effective value of a detected result. Concerning the AC component of the speed, only the speed variation of the low frequency has to be calculated. In the image forming apparatus, a speed variation of the photosensitive drum is calculated to correct a position of a writing image. Correction of the writing position can not be carried out for the speed variation with several Hz (i.e., for the high frequency speed variation). Therefore, even if a detecting speed variation is of the high frequency type (short cycle), the result cannot be used actually. Accordingly, when the apparatus for detecting rotating speed 30 of the present invention is applied to a photosensitive drum, the speed variation of the low frequency is detected.

Figure 4B:
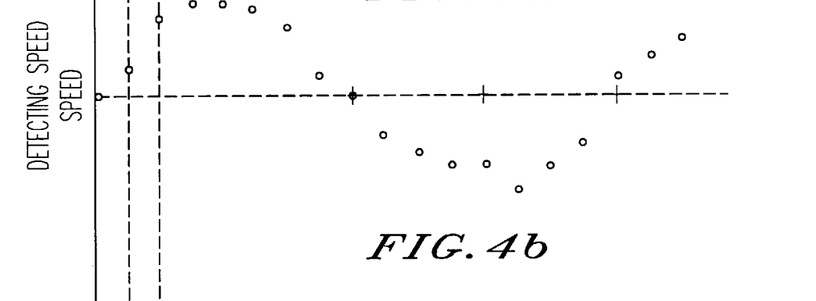
Figure 4C:
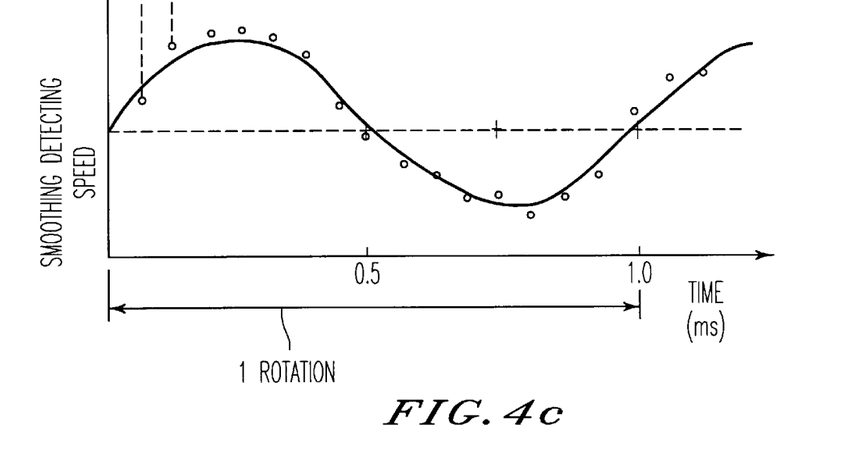

FIG. 4(b) shows a result for detecting a rotating speed for a speed variation of a photosensitive drum. This result indicates a detection of speed corresponding to the speed variation of low frequency. However, as the detected result includes the speed variation of high frequency, the detected speed has to be smoothed, for example by data disposal, to show only the speed variation of the low frequency. FIG. 4(c) shows such a smoothed detecting speed signal. The smoothing disposal may be carried out in response to a cycle of a precedent speed variation factor. For example, when calculating the speed variation only for the speed variation of one rotation period of the photosensitive drum, data can be disposed so that a sine wave varied in one rotation can be fit to the detected data.

When there is an unnecessary speed variation component of a high frequency as mentioned above in the detecting speed by the apparatus 30, it is possible to reduce a number of slits 31 for detecting the rotating speed, and it is also possible to reduce a number of slits 31 formed on the rotating disc 32. For example, the background rotary encoder requires several thousand of slits. However in an apparatus for detecting rotational speed in accordance with the present invention when applied to a photosensitive drum, only several scores of slits are required, as only speed variations of the low frequency are required to be detected. It is an advantage in the present invention that a number of slits can be reduced compared with the background devices.

Figure 5:
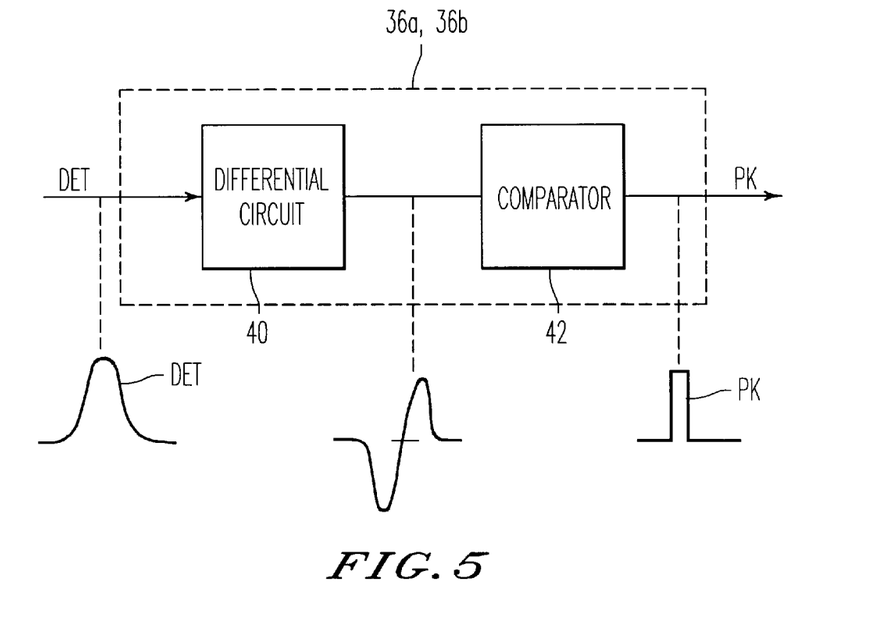
FIG. 5 is a block view showing a peak detecting device.
Figure 6:
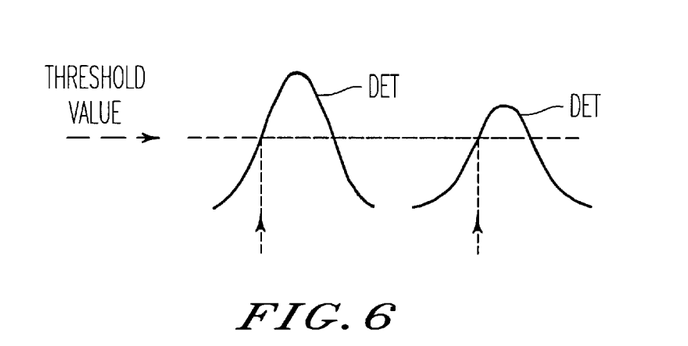
FIG. 6 is a view showing a difference of a detecting timing by variations of amplitude intensity.
Figure 7:
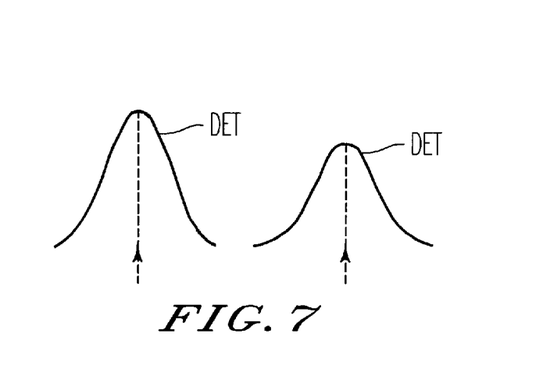
FIG. 7 is a view showing a detecting timing by a peak detecting device.

It will now be explained how in the present invention to obtain a detecting timing of peak points of the detecting signal DET1, DET2. FIG. 5 is a view showing a general structure of each of the peak detectors 36a, 36b. The detecting signal DET is differentiated by a differential circuit 40 to generate a differentiated signal. From the differentiated signal, a zero-cross point is detected by the comparator 42, and a peak detecting signal PK is output to indicate detection of this zero-cross point. Such peak detectors 36a, 36b can detect a timing of accurate peak position, even if an amplitude of the input signal DET is varied. For example, as shown in FIG. 6, if a detecting timing is obtained by comparing an edge portion of the detecting signal DET with one threshold value, though the detecting timing is out, as shown in FIG. 7, the detecting timing cannot be out in detecting a peak position.

In this way, in accordance with a first feature of the present invention, by calculating a time difference when one slit passes plural detecting points and calculating a rotational speed of the rotating object by this time difference, it is possible to avoid detecting an error caused by a positional difference of an axis of the rotating body as an object whose rotation is to be detected and a pitch difference. Therefore, an accuracy of speed detecting can be improved. Furthermore, it becomes unnecessary to require a very high accuracy in a structure for avoiding a positional difference of axes and pitch difference, and thereby a cost can be reduced.

In accordance with a second feature of the present invention, as a rotating speed can be detected by detecting a time of a peak point of the detected signal, there is no detecting error for a signal with intense variation. Therefore, accuracy of a detecting speed can be improved.

In accordance with a third feature of the present invention, as unnecessary high frequency components can be ignored in certain applications, or can be removed by a smoothing disposal, a number of slits formed on the rotating disc can be reduced, and therefore manufacturing cost can be further reduced.

Obviously, numerous additional modifications and variations of the present invention are possible in light of the above teachings. It is therefore to be understood that within the scope of the appended claims, the present invention may be practiced otherwise than as specifically described herein.

The present application is based on Japanese Priority Document 8-184,424, the contents of which are incorporated herein by reference.

What is claimed as new and is desired to be secured by Letters Patent of the United States is:

1. An apparatus for detecting a rotational speed of a rotating object, comprising:
    a rotating disc attached to an axis of the rotating object, the rotating disc including a plurality of slits;
    a radiant element radiating rays through the plurality of slits;
    first and second photodetecting elements separated by a predetermined distance ΔL receiving the radiating rays radiated from the radiant element through the plurality of slits; and
    a calculator calculating a rotational speed of the rotating object based on signals output by the first and second photodetecting elements, wherein the calculator calculates the rotational speed by dividing the predetermined distance ΔL separating the first and second photodetector elements by a time ΔT required for the first and second photodetecting elements to detect radiating rays passing through a same slit.

2. The apparatus according to claim 1, further comprising first and second peak detectors peak detecting the signals output by the respective first and second photodetector elements and supplying respective peak detected signals to the calculator.

3. The apparatus according to claim 2, wherein each peak detector comprises a differential circuit and a comparator.

4. The apparatus according to claim 3, wherein the comparator of each peak detector detects a zero-cross point.

5. The apparatus according to claim 2, further comprising first and second amplifiers formed respectively between the first and second photodetecting elements and the first and second peak detectors.

6. The apparatus according to claim 1, wherein the calculator smooths a signal indicating the calculated rotational speed by removing high-frequency components.

7. The apparatus according to claim 1, wherein the radiant element comprises an LED.

8. The apparatus according to claim 1, wherein the first and second photodetecting elements comprise photodiodes.

9. An apparatus for detecting a rotational speed of a rotating object, comprising:

rotating means attached to an axis of the rotating object, the rotating means including a plurality of slit means;

radiating means for radiating rays through the plurality of slit means;

first and second photodetecting means separated by a predetermined distance $\Delta L$ for receiving the radiating rays radiated from the radiating means through the plurality of slit means; and calculating means for calculating a rotational speed of the rotating object based on signals output by the first and second photodetecting means, wherein the calculator means calculates the rotational speed by dividing the predetermined distance $\Delta L$ separating the first and second photodetector means by a time $\Delta T$ required for the first and second photodetecting means to detect radiating rays passing through a same slit means.

10. The apparatus according to claim 9, further comprising first and second peak detector means for peak detecting the signals output by the respective first and second photodetectors means and supplying respective peak detected signals to the calculator means.

11. The apparatus according to claim 10, wherein each peak detector means comprises a differential circuit means and a comparator means.

12. The apparatus according to claim 11, wherein the comparator means of each peak detector means detects a zero-cross point.

13. The apparatus according to claim 10, further comprising first and second amplifier means formed respectively between the first and second photodetecting means and the first and second peak detector means for amplifying signals output by the first and second photodetecting means.

14. The apparatus according to claim 9, wherein the calculator means smooths a signal indicating the calculated rotational speed by removing high-frequency components.

15. The apparatus according to claim 9, wherein the radiating means comprises an LED means.

16. The apparatus according to claim 9, wherein the first and second photodetecting means comprise photodiodes means.

* * * * *